United States Patent [19]
Iizuka

[11] Patent Number: 5,189,546
[45] Date of Patent: Feb. 23, 1993

[54] SCANNING OPTICAL SYSTEM WITH OFFSET LENS COMPONENT

[75] Inventor: Takashi Iizuka, Tokyo, Japan

[73] Assignee: Asahi Kogaku Kogyo Kabushiki Kaisha, Tokyo, Japan

[21] Appl. No.: 765,937

[22] Filed: Sep. 26, 1991

[30] Foreign Application Priority Data

Sep. 27, 1990 [JP] Japan .................................. 2-258647
Aug. 19, 1991 [JP] Japan .................................. 3-206703

[51] Int. Cl.$^5$ ............................................. G02B 26/08
[52] U.S. Cl. .................................... 359/217; 359/206; 359/207
[58] Field of Search ............... 359/206, 207, 216, 217, 359/218, 219; 250/234, 235, 236

[56] References Cited

U.S. PATENT DOCUMENTS

| | | | |
|---|---|---|---|
| 3,865,465 | 2/1975 | Tatuoka et al. | 359/216 |
| 4,367,009 | 1/1983 | Suzki | 359/216 |
| 4,585,296 | 4/1986 | Minoura et al. | 359/218 |
| 4,930,850 | 6/1990 | Morimoto | 359/207 |
| 4,953,926 | 9/1990 | Morimoto | 359/207 |

FOREIGN PATENT DOCUMENTS 47-31303  3/1972  Japan .
2-23313   1/1990  Japan .

OTHER PUBLICATIONS

English Language Abstract of Japanese Publication 2-23313.

*Primary Examiner*—Loha Ben
*Attorney, Agent, or Firm*—Sandler, Greenblum & Bernstein

[57] ABSTRACT

An optical scanning system is disclosed having a polygon mirror which deflects a light beam from a semiconductor laser in a principal scanning direction, and an fθ lens which forms an image on a scanning surface of the light beam reflected by the polygon mirror. The fθ lens comprises a first lens group and a second lens group having a toric surface. The center axis of either the second lens group, or of only the toric surface of the same, is decentered from the optical axis of the first lens group towards one side of the principal scanning direction, the first lens group being positioned between the second lens group and the deflector.

9 Claims, 6 Drawing Sheets

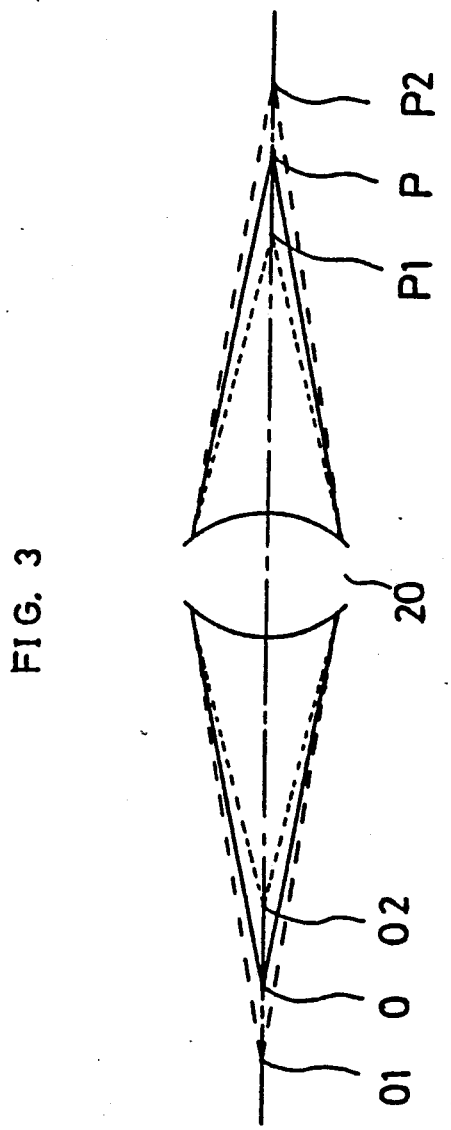

CURVATURE OF FIELD

Fθ CHARACTERISTICS

CURVATURE OF FIELD

Fθ CHARACTERISTICS

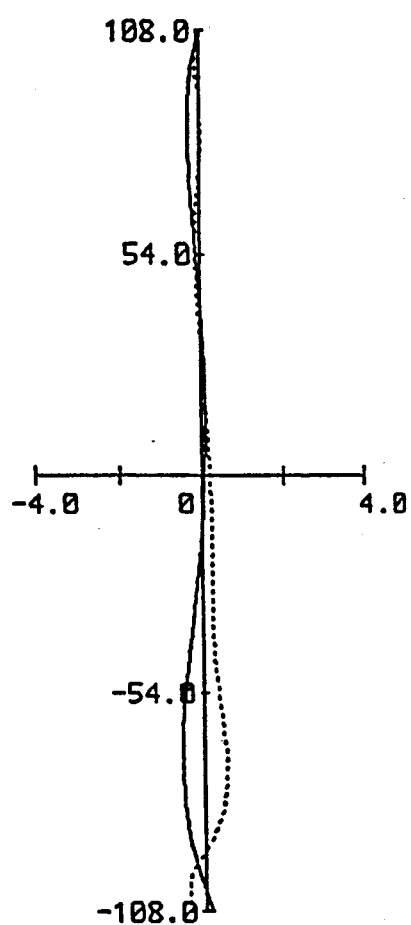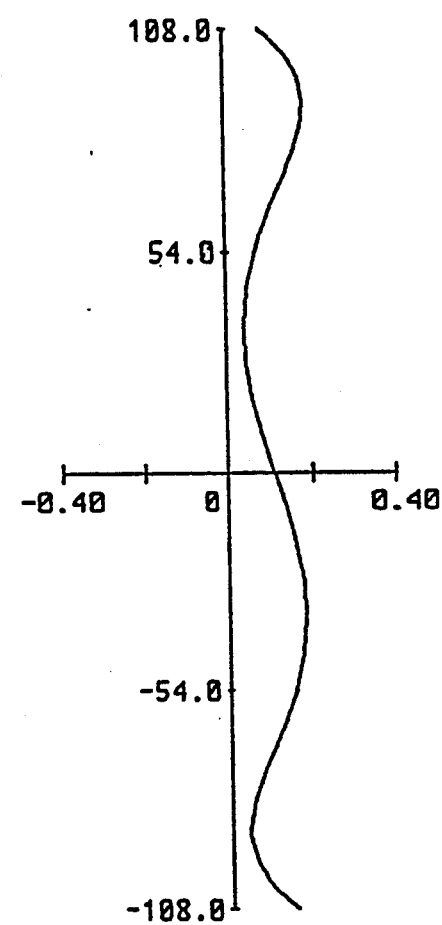
FIG. 6(a)
CURVATURE OF FIELD
FIG. 6(b)
FΘ CHARACTERISTICS

000000
SCANNING OPTICAL SYSTEM WITH OFFSET LENS COMPONENT

BACKGROUND OF THE INVENTION

1. Field of the Invention

This invention concerns a scanning optical system which forms a pattern on a scanning surface by scanning the surface with a laser beam.

2. Description of the Prior Art

In conventional scanning systems of this type, a laser beam, modulated by an ON-OFF modulator, is made to impinge on a polygon mirror, and a light beam reflected and deflected by the polygon mirror is converged onto a scanning surface by an fθ lens. As a result of scanning the beam on the scanning surface, a pattern is formed on the scanning surface.

In conventional scanning optical systems, to correct the misalignment of scanning lines due to tilt errors of the reflecting surface of the polygon mirror, the light beam may be brought to an image in an auxiliary scanning direction by for example combining a cylindrical lens and a toric fθ lens (Japanese Laid-Open Publication No. Sho 48-98844).

In this specification, the direction in which the laser beam is made to scan due to the polygon mirror will be referred to as the principal scanning direction, and the direction perpendicular to this direction will be referred to as the auxiliary direction.

As the light beam incident on the polygon mirror is generally inclined with respect to the optical axis of the fθ lens at an angle of 50°–90°, the deflection point (i.e., the point of intersection between the center axis of the incident beam and the reflecting beam on the reflecting surface) varies asymmetrically on both sides of the optical axis of the fθ lens due to rotation of the polygon mirror. The light beam incident on the polygon mirror is parallel to the principal scanning direction, but is either convergent or divergent in the scanning direction. The imaging point therefore moves in the auxiliary scanning direction due to the variation of deflection point, and the curvature of field on the scanning surface is asymmetrical in the auxiliary scanning direction.

If the curvature of field with respect to the optical axis is generated asymmetrically, and especially if it is generated as an odd function, the valve of the curvature increases in the positive sense even if it is decreased in the negative sense and vice versa, so it cannot be decreased on average. In correcting the curvature of field, therefore, rather than trying for example to make the curvature of field on the optical axis equal to 0, it is more important to limit the curvature of field over the whole scanning region by reducing its peak value such that it remains within the focusing depth.

In Japanese Laid-Open Publication No. Hei 2-23313, an apparatus is proposed wherein the curvature of field is generated symmetrically with respect to the optical axis by incorporating a lens in the scanning lens group which varies the radius of curvature in the auxiliary scanning direction, asymmetrically with respect to the optical axis. This asymmetrical lens however is difficult to manufacture, and it increases the overall cost of the apparatus.

SUMMARY OF THE INVENTION

The present invention was conceived to overcome the above problems. An object of the present invention is to provide a scanning optical wherein the curvature of field in the auxiliary scanning direction is symmetrical with respect to the optical axis without increasing the cost of the apparatus, and wherein the curvature of field over the whole scanning region can be reduced.

BRIEF DESCRIPTION OF THE DRAWINGS

FIG. 3 is a schematic view illustrating the variation of the deflection point and the displacement of the imaging point.

FIG. 4(a) shows the curvature of field, and FIG. 4(b) shows fθ characteristics.

FIG. 5(a) shows the curvature of field, and FIG. 5(b) shows fθ characteristics.

FIGS. 6(a) and 6(b) are drawings of the aberration when only the toric surface of the second lens group is decentered with respect to the optical axis of the first lens group. FIG. 6(a) shows the curvature of field, and FIG. 6(b) shows fθ characteristics.

DETAILED DESCRIPTION OF THE EMBODIMENTS

The embodiment of the present invention will now be described hereinafter with reference to the drawings. The present disclosure relates to the subject matter contained in Japanese patent applications Nos. H2-158647 (filed on Sep. 27, 1990) and H3-206703 (filed on Aug. 19, 1991), which are expressly incorporated herein by reference in their entireties.

FIG. 1–FIG. 6 illustrate by way of example, a preferred embodiment of the scanning optical system of the present invention.

Figure 1:
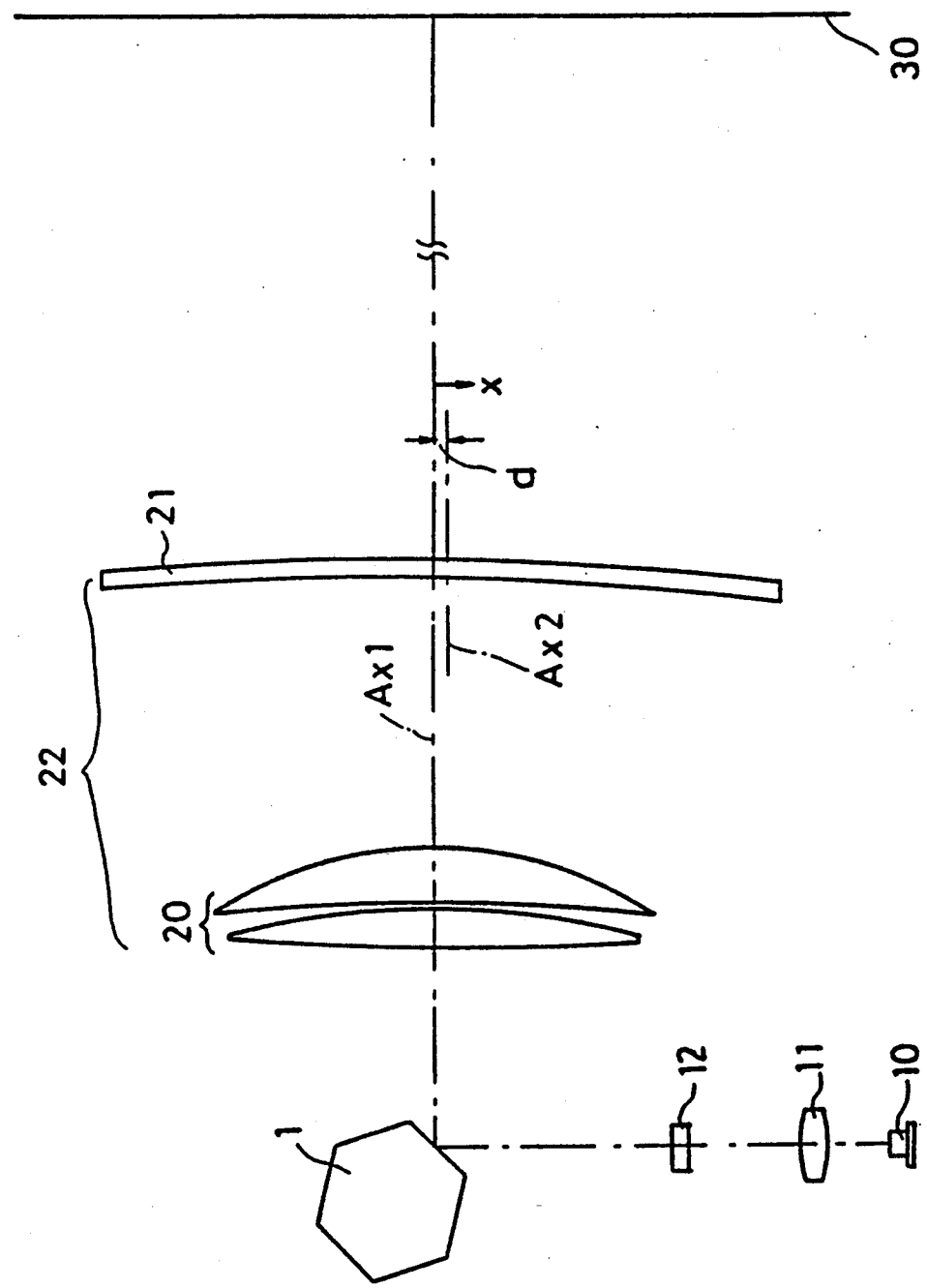
FIG. 1 is a schematic view of the principal scanning direction illustrating one embodiment of the scanning optical system of the present invention.
Figure 2:
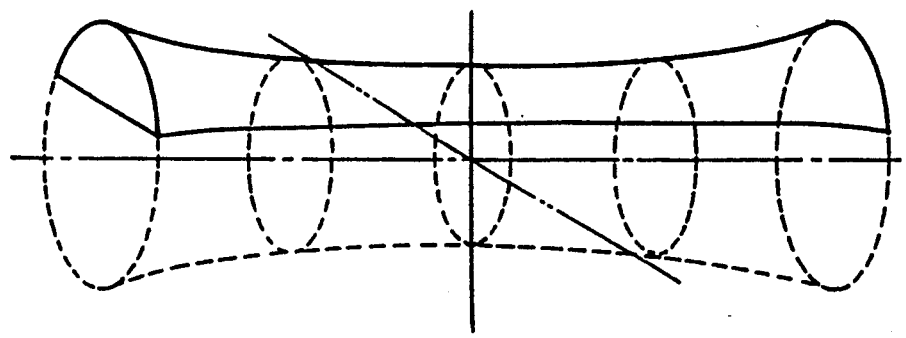
FIG. 2 is a schematic view illustrating the form of the toric surface in the second lens group.

As shown in FIG. 1, a light beam from a semiconductor laser 10 is collimated by a collimator lens 11, converged in an auxiliary scanning direction by a cylindrical lens 12, and then reflected and deflected by a polygon mirror 1 which acts as a scanning deflector.

The light beam reflected from the polygon mirror 1 impinges on an anamorphic fθ lens 22 which acts as a scanning lens. The fθ lens 22 comprises a first lens group comprising two lenses 20, and a second lens group 21 which includes a toric surface. The center axis Ax2 of the second lens group 21 is decentered from the optical axis Ax1 of the first lens group 20 by a distance d, towards one side of the principal scanning direction.

The power of the second lens group 21 is almost equal to 0 in the principal scanning direction. Since its toric surface is shaped such that its radius of curvature in the auxiliary scanning direction shown by the double dotted line in FIG. 2 increases monotonically from the center of the lens towards the periphery, the power in the auxiliary scanning direction decreases from the center towards the periphery.

The light beam reflected by the polygon mirror 1, and converged by the first lens group 20, passes through the second lens group 21 to form a spot on the scanning surface 30.

Table 1 shows specific numerical examples of this embodiment. In the table, E.P. is the position of the entrance pupil, r is the radius of curvature of the lens (in the case of the fifth surface which is a toric surface, this is the radius of curvature in the principal scanning direction), rz is the radius of curvature in the auxiliary scanning direction, d is the lens thickness or the spatial distance, and n is the refractive index of the lens.

The first surface of this lens is a spherical. The aspherical surface is expressed as follows;

$$X = \frac{CY^2}{1 + \sqrt{1 - (1 + K)C^2Y^2}} + A4Y^4 + A6Y^6 + A8Y^8$$

wherein X is a distance from a tangential plane of the vertex of an aspherical surface on the spherical surface where the height Y from the optical axis, C is the curvature (1/r) of the vertex of the aspherical surface, K is the coefficient of a circular cone, and the A4, A6, A8 and A10 are spherical surface coefficients. These coefficients are as shown in Table 2.

TABLE 1

| surface number | r | rz | d | n |
|---|---|---|---|---|
| E.P. | | | 50.464 | |
| 1 | 707.012 | | 10.000 | 1.48479 |
| 2 | −176.584 | | 2.000 | |
| 3 | −330.098 | | 13.000 | 1.48479 |
| 4 | −99.574 | | 67.045 | |
| 5 | −688.706 | 22.420 | 5.000 | 1.48479 |
| 6 | −685.653 | | 74.782 | |

TABLE 2

| K = 0.16520 |
| A4 = −1.49935 × $10^{-7}$ |
| A6 = 2.28076 × $10^{-11}$ |
| A8 = −2.25751 × $10^{-15}$ |

The second lens group 21 is disposed such that its center axis Ax2 is displayed by −2.50 mm in the principal scanning direction with respect to the optical axis Ax1 of the first lens group.

The line spread function image formed by the cylindrical lens 12 is closer by 35.253 mm to the scanning surface than the deflection point when the reflected beam coincides with the optical axis Ax1 of the first lens group 20.

Further, with respect to the point of intersection between the optical axis of the fθ lens 22 and the optical axis of the cylindrical lens 12, the center of rotation of the polygon mirror 1 is 13.86 mm further than the fκ lens in the direction of the optical axis of the fθ lens, and 10.39 mm further than the cylindrical lens in the direction of the optical axis of the cylindrical lens.

When the polygon mirror 1 rotates, the deflection point of the light beam from the semiconductor laser 10 varies. This causes the imaging point of the light beam which has passed through the first lens group 20 to vary in the auxiliary scanning direction as shown in FIG. 3. For example, a light beam which is reflected and deflected at a reference position O is brought to an image at a point P by the first lens group 20, but when the deflection point is further away from the first lens group 20 as in the case of 01, the imaging point is closer to the first lens group 20 as in the case of P1. Conversely, a light beam deflected at a point 02 closer than the reference position to the first lens group 20, is brought to an image at a point P2 further away from the first lens groups 20.

Due to this variation of the deflection point, assuming that the second lens group 21 is not OFF Center (decentered) the imaging point (i.e., the focal point of the image) of light being scanned above the optical axis is closer to the fθ lens 22 than the scanning surface, and conversely the imaging point of light being scanned below the optical axis moves further away from the fθ lens 22 than the scanning surface.

Figure 4A:
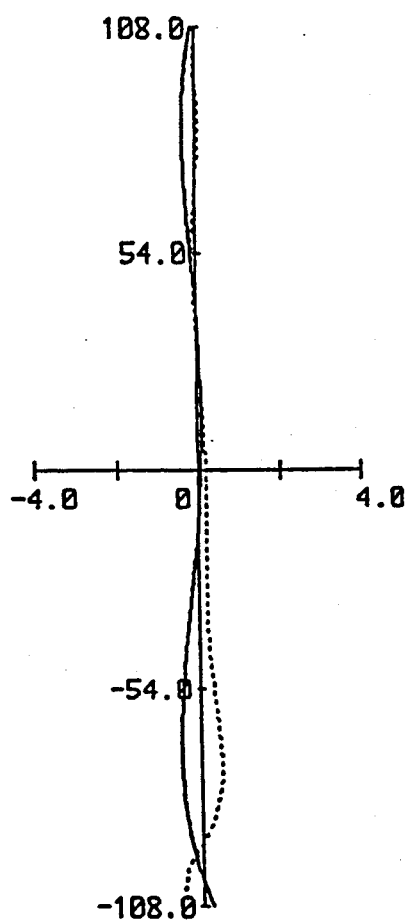
FIGS. 4(a) and 4(b) are drawings of the aberration when the whole second lens group is decentered with respect to the optical axis of the first lens group.
Figure 4B:
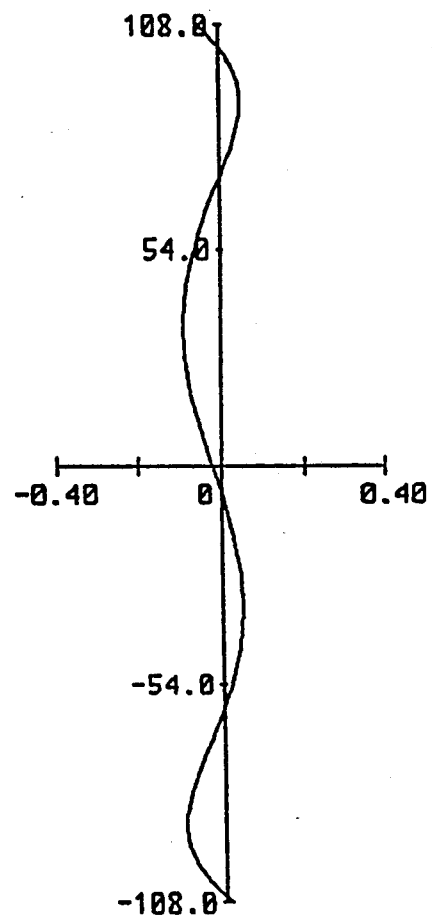
Figure 5A:
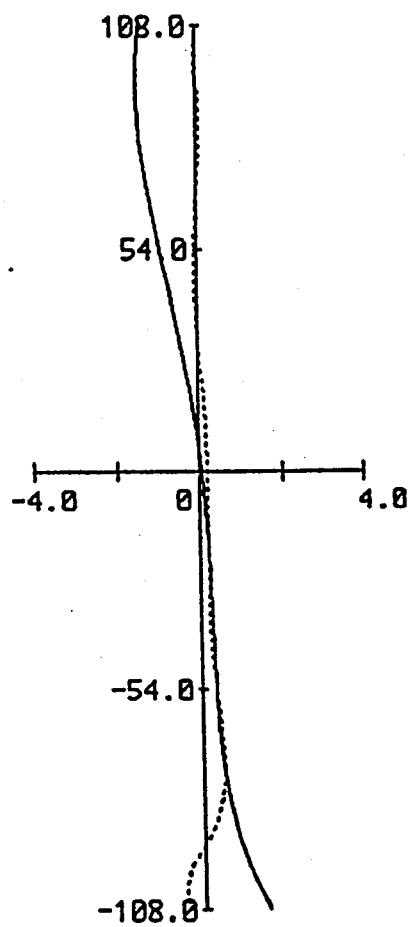
FIGS. 5(a) and 5(b) are drawings of the aberration when the second lens group is not decentered.
Figure 5B:
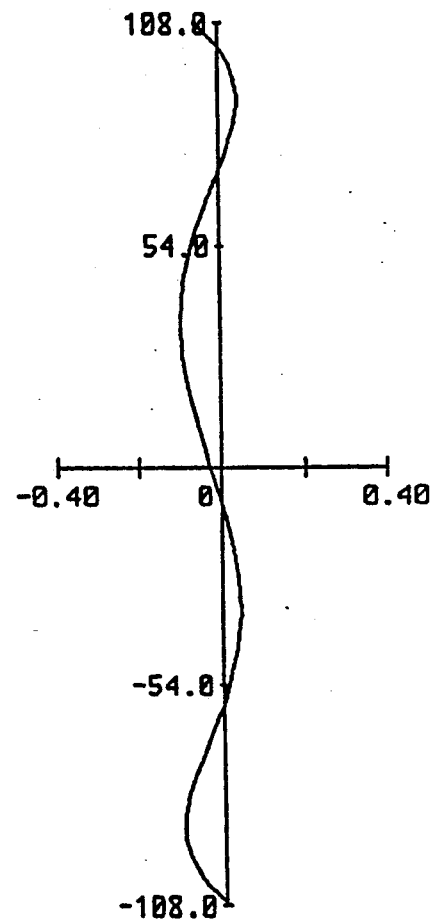

FIGS. 4(a) and 4(b), 5(a) and 5(b), and 6(a) and 6(b) illustrate aberration of an image formed by the optical system, by depicting the curvature of field in FIGS. 4(a), 5(a) and 6(a) and the fθ characteristics in FIGS. 4(b), 5(b) and 6(b).

FIG. 4(a) shows the curvature of field when the second lens group is decentered. The solid line represents the auxiliary scanning direction, and the dotted line represents the principal scanning direction. Further, FIG. 4(b) shows the fθ characteristics when the second lens group is decentered.

In this embodiment, the second lens group as a whole is decentered with respect to the optical axis of the first lens group. As the power of the second lens group in the auxiliary scanning direction decreases monotonically from the center to the periphery, the power of the fθ lens as a whole in this direction is therefore weaker in the region above the optical, axis Ax1 in the figure, and stronger in the region below the optical axis Ax1 in the figure.

The misalignment of the imaging point in the auxiliary scanning direction due to the variation of the deflection point is therefore eliminated by the power distribution of the fθ lens, so that the curvature of field in this direction is improved as shown by the solid line in FIG. 4(a).

FIGS. 5(a) and 5(b), which are provided for reference purposes, are drawings of the aberration when the center axis Ax2 of the second lens group 21 coincides with the optical axis Ax1 of the first lens group. FIG. 5(a) shows the curvature of field, and FIG. 5(b) shows the fθ characteristics. in FIG. 5(a), the curvature of field in the principal scanning direction is shown by a dotted line, and the curvature of field in the auxiliary scanning direction is shown by a solid line.

It can be seen by comparing FIG. 4(a) and FIG. 5(a) that the amount of curvature of field produced in the auxiliary scanning direction is made smaller by decentering, and that it is produced symmetrically with respect to the optical axis. Moreover, the curvature of field in the principal scanning direction shown by the dotted line in FIG. 4(a) is almost identical to FIG. 5(a) when there is no decentering. It can also be seen from FIG. 4(b) and FIG. 5(b) that fθ characteristics are almost identical irrespective of whether or not there is decentering, that the decentering of the second lens group has no effect on other elements. Thus, essentially, the only effect of decentering the second lens group is to correct the curvature of field in the auxiliary scanning direction.

Next, the variation of performance will be described in another embodiment wherein the optical axis of only the toric surface on the polygon mirror side of the second lens group is decentered (moved OFF center) with respect to the optical axis of the first lens group, and the center axis of the spherical surface on the scanning surface side is made to coincide with the optical axis of the first lens group. Apart from this modification, the other numerical parameters are identical to those of the above described embodiment.

FIG. 6(a) shows the curvature of field, and FIG. 6(b) shows the fθ characteristics, for this second embodiment. The curvature of field in the principal scanning direction is close to symmetrical, as in the case where the whole of the second lens group is decentered. The curve of fθ characteristics shown in FIG. 6(b) is more to the right of the figure than in FIG. 5(b), showing that the entire scanning position has shifted in the auxiliary scanning direction. As this shift can be canceled by displacing the scanning object surface in the principal scanning direction, it does not present a problem in actual practice.

Further, as a difference occurs in the curvature of field as shown in FIG. 4(a) and FIG. 6(a) depending on whether or not the spherical surface on the scanning surface side of the second lens group is decentered, the performance of the optical system can be adjusted by selecting the amount of decentering of the spherical surface on the scanning side independently of the toric surface.

In the above described embodiments, the only case which has been described is where the second lens group is decentered toward the lower side of the principal scanning direction (direction x in FIG. 2); however, as the side toward which the second lens group should be decentered is determined by the curvature of field of the fθ lens due to the variation of the deflection point, this side will not necessarily be the lower side.

According to the scanning optical system of the invention, therefore, the curvature of field in the auxiliary scanning direction can be reduced, and the curvature can be made substantially symmetrical with respect to the optical axis even if the shape of the lens is not made asymmetrical.

The cost of manufacturing the apparatus can therefore be reduced compared to the case where the lens is made asymmetrical. Further, as the apparatus permits high precision tracing, it is suitable for optical systems having a shallow focusing depth with a narrow spot diameter.

Further, although plastic lenses have a larger focusing point temperature dependence than glass lenses, the apparatus of the invention can still be used with plastic lenses.

In the particular embodiments of the invention disclosed herein, the position of a portion of a second lens group is adjusted; that is, a portion of a second lens group is positioned off-center. This adjustment may be performed during the initial assembly or manufacture of the scanning optical system, or conventional means may be provided which enable either manual or automatic adjustment (or both) of the position of the portion of the second lens group, with the required degree of accuracy, subsequent to assembly of the system.

What is claimed is:

1. A scanning optical system comprising:
   a scanning deflector for deflecting a light beam from a light source in a principal scanning direction; and
   a scanning lens which forms an image of the light beam reflected by said scanning deflector on a scanning surface;
   said scanning lens comprising at least one lens, the center axis of at least one surface of said at least one lens being decentered from the center axis of another surface of said scanning lens towards one side of said principal scanning direction.

2. A scanning optical system according to claim 1, wherein said scanning lens comprises a first lens group and a second lens group, the center axis of said second lens group being decentered from the optical axis of said first lens group towards one side of said principal scanning direction.

3. A scanning optical system according to claim 1, wherein said scanning lens comprises a first lens group and a second lens group, the center axis of one side surface of said second lens group being decentered from the optical axis of said first lens group towards one side of said principal scanning direction.

4. A scanning optical system according to claim 1, wherein said at least one lens comprises a lens having a radius of curvature in the auxiliary scanning direction which varies symmetrically with respect to a center axis of said at least one lens.

5. A scanning optical system comprising:
   a scanning deflector for deflecting a light beam from a light source in a principle scanning direction; and
   an anamorphic scanning lens which forms an image of the light beam reflected by said scanning deflector on a scanning surface;
   said scanning lens comprising a first lens group and a second lens group having a toric surface, the center axis of said second lens group being decentered from the optical axis of said first lens group towards one side of said principal scanning direction, and said first lens group being positioned between said second lens group and said deflector.

6. A scanning optical system according to claim 5, wherein power of said toric surface of said second lens group decreases monotonically in an auxiliary scanning direction as the distance from the center axis increases.

7. A scanning optical system according to claim 5, wherein said second lens group comprises a lens having a radius of curvature in the auxiliary scanning direction which varies symmetrically with respect to a center axis of said lens.

8. A scanning optical system comprising:
   a scanning deflector for deflecting a light beam from an optical source in a principal scanning direction; and
   an anamorphic scanning lens which forms an image of the light beam reflected by said scanning deflector on a scanning surface;
   said scanning lens comprising a first lens group and a second lens group having a toric surface, the center axis of only said toric surface being decentered from the optical axis of said first lens group towards one side of said principal scanning direction, and said first lens group being positioned between said second lens group and said deflector.

9. A scanning optical system according to claim 8, wherein said second lens group comprises a lens having a radius of curvature in the auxiliary scanning direction which varies symmetrically with respect to a center axis of said lens.

* * * * *